United States Patent [19]

Takeda

[11] Patent Number: 4,691,285

[45] Date of Patent: Sep. 1, 1987

[54] METHOD AND APPARATUS FOR ALLEVIATING TRANSMISSION SHIFT SHOCKS

[75] Inventor: Hitoshi Takeda, Yokohama, Japan

[73] Assignee: Nissan Motor Co., Ltd., Yokohama, Japan

[21] Appl. No.: 683,354

[22] Filed: Dec. 19, 1984

[30] Foreign Application Priority Data

Dec. 21, 1983 [JP] Japan .................. 58-239684

[51] Int. Cl.$^4$ .................. B60K 41/08; G06F 15/20
[52] U.S. Cl. .................. 364/424.1; 74/866
[58] Field of Search ............... 364/424.1; 74/858, 859, 74/860, 866

[56] References Cited

U.S. PATENT DOCUMENTS

| | | | |
|---|---|---|---|
| 3,335,830 | 8/1967 | De Castelet | 74/858 |
| 3,817,121 | 6/1974 | Muller-Berner | 74/858 |
| 4,222,292 | 9/1980 | Will et al. | 74/866 |
| 4,226,141 | 10/1980 | Espenschied | 74/860 X |
| 4,266,447 | 5/1981 | Heess et al. | 74/866 X |
| 4,344,513 | 8/1982 | Etienne | 192/103 R |
| 4,370,903 | 2/1983 | Stroh et al. | 74/866 X |
| 4,370,904 | 2/1983 | Müller et al. | 74/866 X |
| 4,403,527 | 9/1983 | Mohl et al. | 74/866 X |
| 4,493,228 | 1/1985 | Vukovich et al. | 74/866 X |
| 4,520,694 | 6/1985 | Eschrich et al. | 74/866 X |

FOREIGN PATENT DOCUMENTS

3137217  4/1983  Fed. Rep. of Germany .

*Primary Examiner*—Felix D. Gruber
*Attorney, Agent, or Firm*—Schwartz, Jeffery, Schwaab, Mack, Blumenthal & Evans

[57] ABSTRACT

In order to alleviate shocks occurring when an automatic transmission driven by an engine shifts between reduction ratios, the engine is caused to change its output torque by an amount indicated by a target torque variation. The target torque variation is set in response to an estimated engine revolution speed variation before and after the shifting operation.

10 Claims, 7 Drawing Figures

METHOD AND APPARATUS FOR ALLEVIATING TRANSMISSION SHIFT SHOCKS

CROSS-REFERENCES TO RELATED APPLICATIONS

The related applications are as follows:

(1) U.S. patent application Ser. No. 678,889, filed by Akio HOSAKA on Dec. 6, 1984;

(2) U.S. patent application Ser. No. 678,885, filed by Akio HOSAKA et al on Dec. 6, 1984;

(3) U.S. patent application Ser. No. 680,786, filed by Akio HOSAKA et al on Dec. 12, 1984 (now U.S. Pat. No. 4,615,410);

(4) U.S. patent application Ser. No. 680,881, filed by Akio HOSAKA on Dec. 12, 1984;

(5) U.S. patent application Ser. No. 680,785, filed by Akio HOSAKA on Dec. 12, 1984;

(6) U.S. patent application Ser. No. 678,886, filed by Akio HOSAKA on Dec. 6, 1984;

(7) U.S. patent application Ser. No. 698,377, filed by Hitoshi TAKEDA et al on Feb. 5, 1985;

(8) U.S. patent application Ser. No. 694,409, filed by Akio HOSAKA on Jan. 24, 1985.

BACKGROUND OF THE INVENTION

The present invention relates to a method of and an apparatus for alleviating transmission shift shocks, particularly in an automatic transmission.

Figure 6A:
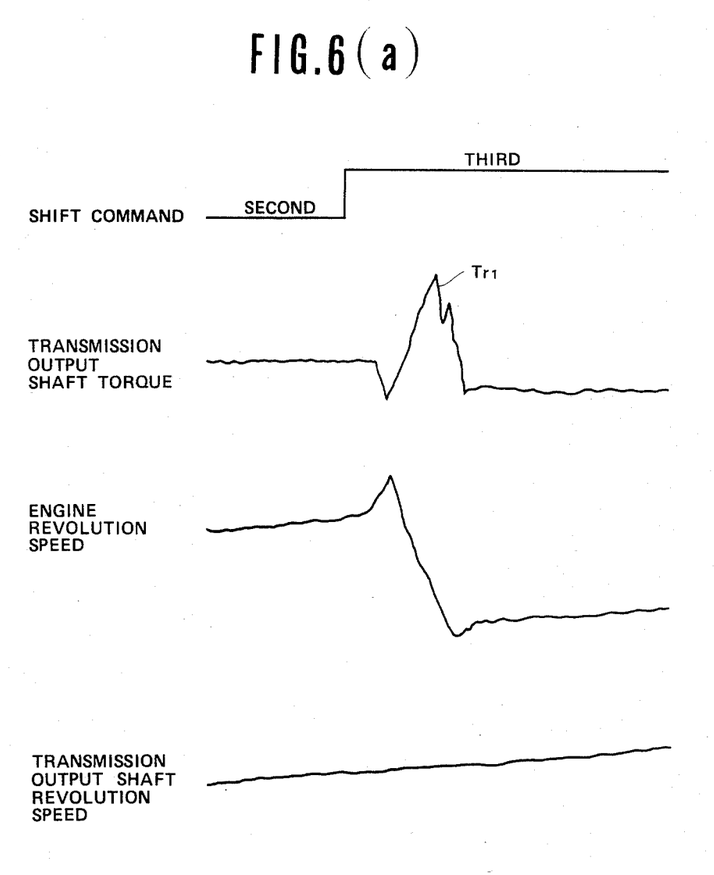
FIG. 6(a) is a time chart illustrating 2-3 shift which has been previously discussed.

Automatic transmissions are now widely used in automotive vehicles as a drive for driving wheels of an automotive vehicle. When the automatic transmission shifts between reduction ratios or gear ratios, so-called shift shocks are caused mainly by the inertia of the engine because of a rapid and considerable change in a difference between an engine revolution speed and a transmission output shaft revolution speed as a result of shifting operation. This is described in detail referring to FIG. 6(a) where a 2-3 upshift operation is illustrated. As readily understood from FIG. 6(a), a change in the transmission output shaft revolution speed after the 2-3 shift is very small, whereas a change in the engine revolution speed is rapid and large. This causes a substantial increase in difference between the engine revolution speed and the transmission output shaft revolution speed after the upshift, causing a peak ($T_{r1}$) in transmission output shaft torque to occur during shifting operation, resulting in substantial shocks.

In order to alleviate shift shocks, Laid-open Japanese Patent Application No. 58-77138 published May 10, 1983 discloses an apparatus for alleviating shift shocks wherein a transmission input shaft revolution speed (corresponding to an engine revolution speed) and a transmission output shaft revolution speed are detected, and control factors of an engine are controlled to increase or decrease output torque of the engine so as to keep an absolute difference between the transmission input and output revolution speeds below a predetermined value. In this control process, the detection of the transmission input and that of the output revolution speeds are repeated during shifting operation in order to enable torque up or torque down control in output torque of the engine which is carried out in response to the difference between the detected transmission input and output revolution speeds.

However, a delay occurs between an instant when the transmission input and output revolution speeds are detected and the subsequent instant when the engine torque control responsive to the result of the detection is carried out. This means that the torque control to be carried out based on a difference between the transmission input and output revolution speed detected at the preceding instant does not reflect an actual difference between the input and output revolution speeds taking place at the instance of the torque control. Therefore, the torque control carried out in this manner is not sufficiently accurate and thus does not result in satisfactory alleviation of shift shocks.

Besides, when the delay mentioned above results in a delay in converging the difference between the detected transmission input and output revolution speeds within the predetermined range, the torque control will continue even after the completion of the actual shifting operation. If this happens, a sluggish response to acceleration demand is encountered immediately after the shifting, resulting in poor acceleration performance.

SUMMARY OF THE INVENTION

According to the present invention, a variation in engine revolution speed which is to result from shifting operation is estimated prior to the shifting operation and this estimated engine revolution speed variation is used in controlling the engine in its output torque.

An object of the present invention is to provide a method of and an apparatus for alleviating shift shocks wherein the shift shocks are alleviated to a satisfactory degree without causing any sluggish acceleration after the shifting operation.

According to one aspect of the present invention, there is provided a method of alleviating shocks occurring when a transmission shifts from one reduction ratio to another reduction ratio, the transmission having an output shaft and being driven by an engine, the method comprising the steps of:

detecting a shift command occurring in the transmission from the one reduction ratio to the another reduction ratio and generating a shift command signal;

estimating responsive to said shift command signal an engine revolution speed variation during actual shifting operation in the transmission which is caused by the occurrence of said shift command and generating an estimated engine revolution speed variation signal indicative of the engine revolution speed estimated; and controlling the engine such that output torque of the engine is subjected to a temporary change that is variable to a response to said estimated engine revolution speed variation signal so as to alleviate shocks occurring during the shifting operation.

According to another aspect of the present invention, there is provided an apparatus for alleviating shocks occurring when a transmission shifts from one reduction ratio to another reduction ratio, the transmission having an output shaft and being driven by an engine, said apparatus comprising:

means for detecting a shift command occurring in the transmission from the one reduction ratio to the another reduction ratio and generating a shift command signal;

means for estimating responsive to said shift command signal an engine revolution speed variation during actual shifting operation in the transmission which is caused by the occurrence of said shift command and generating an estimated engine revolution speed variation signal; and means for controlling the engine in response to said estimated engine revolution speed variation signal so as to alleviate shocks occurring during the shifting operation.

DETAILED DESCRIPTION OF THE INVENTION

Hereinafter, the present invention is described in detail based on an illustrated embodiment.

Figure 1:
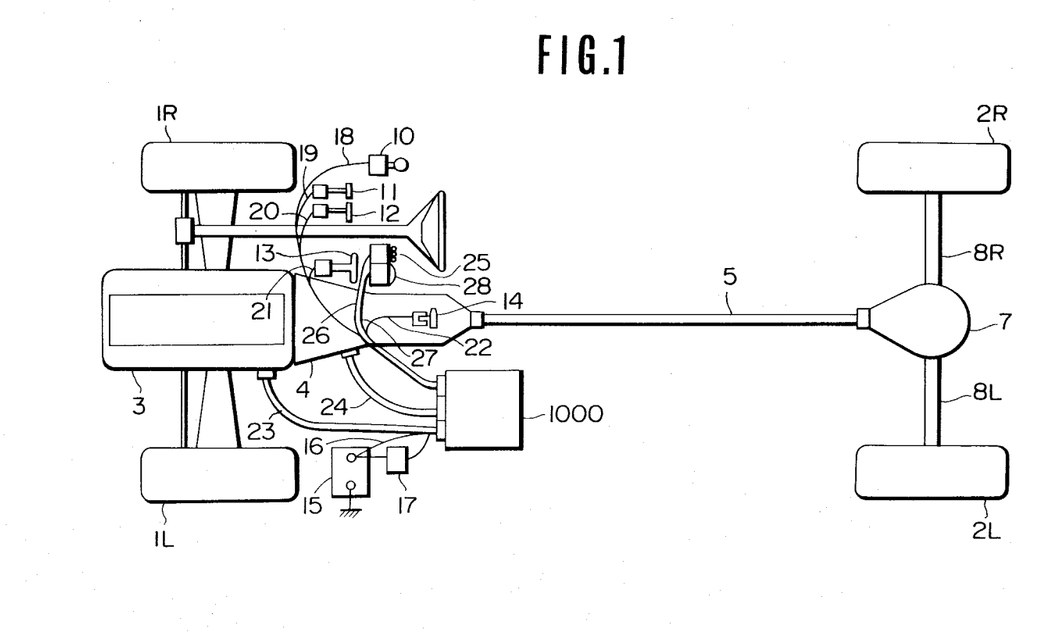
FIG. 1 is a plan view of an automative vehicle illustrating an apparatus for alleviating shift shocks.

Referring to FIG. 1, there is shown a power train control system including a shift shock alleviating apparatus according to the present invention together with a power train of an automotive vehicle which is to be controlled. In the Figure 1L, 1R designate left and right front wheels, respectively, 2L, 2R designate left and right rear wheels, 3 designates an engine, 4 designates a transmission (automatic transmission), 5 designates a propeller shaft, 7 designates a differential gear, 8L, 8R designate left and right rear axles. The front wheels 1L, 1R designate change direction wheels which are controlled by a steering wheel 9 to change direction of the automotive vehicle. The rear wheels 2L, 2R are driving wheels of the automotive vehicle which receive the output of the engine 3 that is delivered via the transmission 4, propeller shaft 5, differential gear 7 and axles 8L, 8R.

The start, operation and stop of the engine 3 is controlled by an ignition switch 10. The engine 3 can increase its output as the accelerator pedal 11 is depressed. The output of the engine 3 is delivered in the above mentioned delivery path to the rear wheels 2L, 2R, enabling the vehicle to run. The vehicle can be stopped by depressing a brake pedal 12 and parked by manipulating a parking brake 13.

The transmission 4, which is to be controlled by the apparatus according to the present invention and forms together with the engine 3 a power train of an automotive vehicle, is rendered to establish a selected power delivery path in response to a manipulated position assumed by a select lever 14, such as a parking (P) range, a reverse (R) range, a neutral (N) range, a forward automatic drive (D) range, a manual second (II) brake range or a manual first (I) brake range and delivers the power from the engine 3 to the propeller shaft 5 with a selected gear position in a selected one of the drive ranges R, D, II and I.

The power train control system, including the shift shock alleviating apparatus according to the present invention, for carrying out the method according to the present invention comprises a control unit 1000 which is common to the engine 3 and the transmission 4. This control unit is always supplied via an electric path 16 with electric power which serves as a direct continuously connected electric power source from a vehicle battery 15 and it operates on an electric power from the vehicle battery 15 which is supplied thereto as a main power source via a power source relay 17 that is closed when the ignition switch 10 is turned ON. Although they are described later, those signals fed to the control unit 1000 are a signal from the ignition switch 10 via an electric path 18, a signal from the accelerator pedal 11 via an electric path 19, a signal from the brake pedal 12 via an electric path 20, a signal from the parking brake lever 13 via an electric path 21, a signal from the select lever 14 via an electric path 22, signals indicative of a crank angle of the engine 3, a crankshaft torque, an intake air flow rate and a temperature via a wire harness 23, and signals indicative of an output shaft revolution speed of the transmission 4 and an output shaft torque thereof via a wire harness 24. Based on these input signals arithmetic operations are performed and the results are fed via the wire harnesses 23, 24 to the engine 3 and the transmission 4, respectively, thereby to control them. The control unit 1000 is also supplied via an electric path 26 with data input signals from a data input device 25 manually operable by a driver, alters its operation mode depending on these data input signals and feeds various kinds of data via an electric path 27 to a display 28 where the data are displayed.

Figure 2:
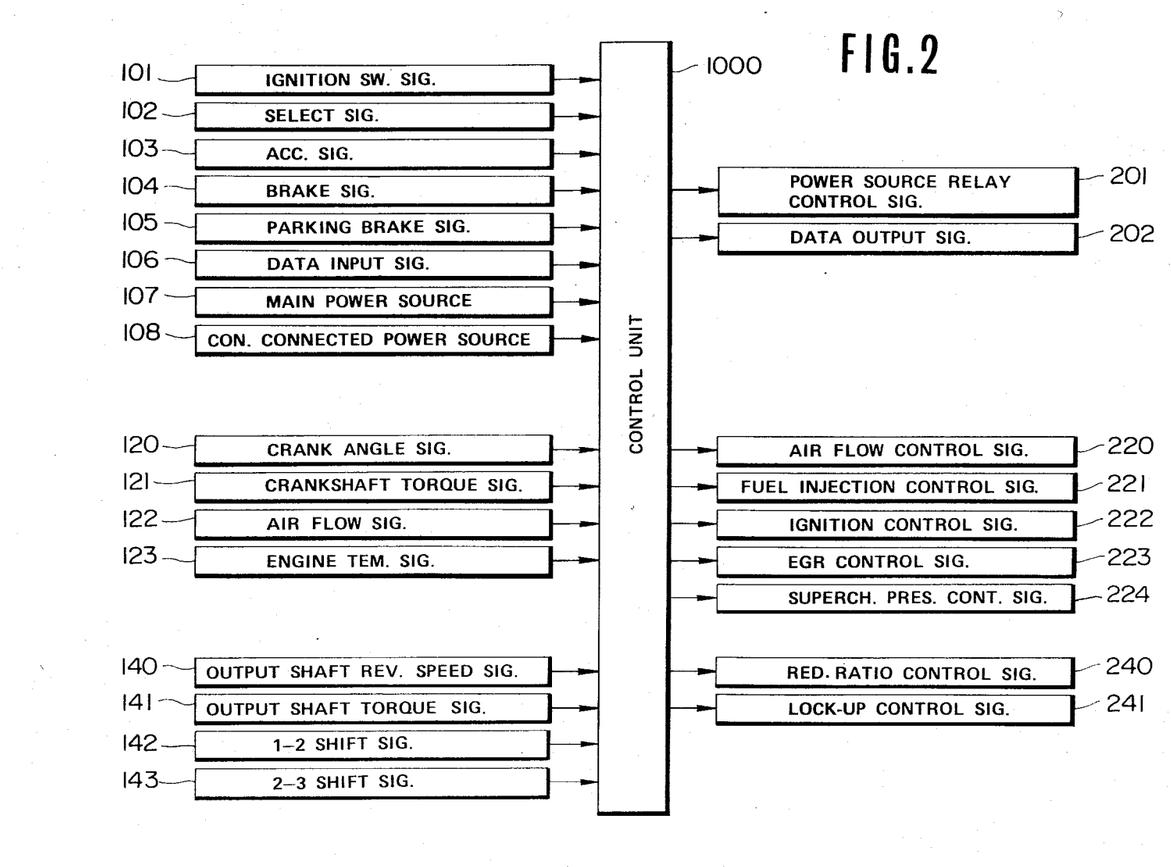
FIG. 2 is a block diagram illustrating a control unit with its various input and output signals.

Referring to FIG. 2, these input and output signals to and from the control unit 1000 are described in detail one after another. Among the input signals, an ignition switch signal 101 is indicative of which one of operation positions the ignition switch 10 assumes including a LOCK position, an OFF position, an ACCESSORY position, an ON position and a START position, and it is fed to the control unit 1000 via the electric path 18. Since the functions when the ignition switch 10 assumes these operation positions are well known, the description is omitted. A select signal 102 is indicative of which one of the before mentioned drive ranges P, R, N, D, II, I is selected via the electric path 28. An accelerator signal 103 which is a voltage signal variable in proportion to the depression degree of the accelerator pedal 11 is obtained by a potentio meter and fed to the control unit 1000 via the electric path 19. A brake signal 104 which is a voltage signal variable in proportion to the depression degree of the brake pedal 12 is obtained by a potentio meter and the like and fed to the control unit 1000 via the electric path 20. A parking brake signal 105 is obtained by a potentio meter and the like that is movable with the parking brake lever 13, which signal is a voltage signal variable in proportion to an operating position of the parking brake lever 13 and fed to the control unit 1000 via the electric path 21. Instead, the brake signal 104 and the parking brake signal 105 may be obtained by pressure sensors, each responsive to a bias force (a braking force) of a brake element. The signals 103, 104 and 105, although they were described previously as analog signals, may take the digital form by using encoders and the like.

A data input signal 106 is a signal from a key board of the data input device 25 or a switch and fed to the control unit 1000 via the electric path 26. The data input signal 106 specifies one of operation modes of the control unit 1000, for example a control operation mode and a self-checking mode or a power mode and a fuel economy mode. The main power source 107 is fed to the control unit 1000 via the power source relay 17 from the vehicle battery 15. The continuously connected power source 108 is always fed to the control unit 1000 via the electric path 16 from the battery 15.

A crank angle signal 120 is a pulse signal which is generated each time after the engine crankshaft has turned through a predetermined angular angle, which signal is fed to the control unit 1000 via the wire harness 23. This signal is generated by a photoelectric detector which detects a light passing through a slit plate, i.e., a disc rotatable with the crankshaft and formed with equiangularly distant slits. A crankshaft torque signal 121 is a voltage signal variable in proportion to the torque impressed on the crankshaft, the torque being detected using the piezoelectric effect. This signal is fed to the control unit 1000 via the wire harness 23. This signal 121 can be obtained by a torque sensor. The air flow signal 122 is a signal variable in inverse proportion to the intake air flow rate admitted to the engine, and it is fed to the control unit 1000 via the wire harness 32. This signal is obtained by an air flow meter usually used in a fuel injection type engine. An engine temperature signal 123 is a signal variable in proportion to a coolant temperature of the engine 3, which signal is fed to the control unit 1000 via the wire harness 23. This signal is obtained by a thermistor which is sensitive to the temperature of an engine coolant.

An output shaft revolution speed signal 140 is a signal variable in proportion to the revolution speed of the output shaft of the transmission 4, which signal is fed to the control unit 1000 via a wire harness 24. This signal can be obtained by computing on a cycle or a frequency of a pulse signal that is generated by a similar means used to generate the crank angle signal 120. As will be understood from the later description of the present invention, the output shaft revolution speed signal 140 may be obtained without a separate sensor because in the case of a well known automatic transmission provided with a torque converter including a lock-up clutch, a value indicative of an output shaft revolution speed can be obtained by arithmetic operation on an engine revolution speed measured when the torque converter locks up and a reduction ratio at the measured instant. The output shaft torque signal 141 is a voltage signal which is proportional to the output shaft torque of the transmission 4, which signal is fed to the control unit 1000 via the wire harness 24. This signal can be generated by a similar torque sensor used to generate the crankshaft torque signal 121. A 1-2 shift signal 142 and a 2-3 shift signal 143 are signals indicative of positions of spools of a 1-2 shift valve and a 2-3 shift valve which are used in the automatic transmission 4 (a three forward speed transmission is used in this example) to determine a reduction ratio. These shift signals are given by 1-2 shift switch and a 2-3 shift switch which are operable responsive to the spool position and fed to the control unit 1000 via the wire harness 24. The 1-2 shift switch is closed for example when the 1-2 shift valve assumes a downshift position, causing the 1-2 shift signal to go to a L-level, and it opens when the 1-2 shift valve assumes an upshift position, causing the 1-2 shift signal 142 to go to a H-level. The 2-3 shift switch is closed for example when the 2-3 shift valve assumes a downshift position thereof, causing the 2-3 shift signal to go to a L-level, and it opens when the 2-3 shift valve assumes the upshift position, causing the 2-3 shift signal 143 to go to a H-level. Thus, the signals 142, 143 take L-level when a first reduction ratio is established because both of the 1-2 and 2-3 shift valves assume downshift position, the signal 142 goes to H-level when the second reduction ratio is selected from the first reduction ratio because the 1-2 shift valve is moved to the upshift position, and the signal 143 also goes to H-level when the third reduction ratio is selected from the second reduction ratio because the 2-3 shift valve is moved to the upshift position also. Therefore, the reduction ratio can be identified by a combination in levels of the signals 142 and 143, and it is also possible to identify a shifting in terms of the instant where the shifting takes place and in what kind of shifting it is by detecting how the signals change their level.

Hereinafter, output signals are described. The power source relay control signal 201 is provided to effect ON/OFF control of the power source relay 17 such that when the engine is in operation where the ignition switch 10 is placed to ON or START position, the power source relay 17 is turned ON, connecting the main power source 107 from the battery 15 via this power source relay 17 to the control unit 1000, and the power source relay 17 is kept closed even after the ignition switch 10 has been turned OFF until saving of the data is completed, keeping the connection of the main power source 107 to the control unit 1000. The data output signal 202 is delivered via the electric path 27 to the display 28, causing same to display a reduction ratio established in the transmission 4, a range selected by the select lever 14, and a result of diagnosis of the power train control system.

An air flow control signal 220 contains an instruction that is responsive to the accelerator signal 103 and is supplied via the wire harness 23 to the well known throttle actuator mounted to the engine 3, causing the throttle actuator to adjust the throttle opening degree to a level corresponding to the depression degree information (accelerator signal 103) of the accelerator pedal 11, thereby to adjust the air flow rate admitted to the engine 3 to a value corresponding to the air flow control signal 220. The air flow control signal 220 adjusts the throttle opening degree via the throttle actuator so as to keep the idle revolution constant. When the data input signal 106 instructs a constant speed cruising, the air flow control signal 220 adjusts via the throttle actuator the throttle opening degree on a result of comparison of a measured vehicle speed with an instructed vehicle speed value (a feedback control) in order to cause the vehicle to run at the instructed vehicle speed value. The fuel injection control signal 221 is a pulse signal which controls the opening time of a fuel injection valve mounted to the engine, which signal is delivered from the control unit 1000 via the wire harness 23. A basic control concept is that the above mentioned valve opening time duration (fuel injection amount), which is proportional to the intake air flow rate, is computed on the crank angle signal 120 and the air flow signal 122, and then this result is corrected in various manners, and the result is output in terms of the fuel injection control signal 221 in synchronism with the operation of the engine 3. The ignition control signal 222 is a signal which controls the ignition energy and the ignition timing by controlling in synchronism with the crank angle signal 120, the time during which current is allowed to pass through a primary coil of an ignition coil provided to the engine 3 and the termination timing of the current supply. This signal is delivered from the control unit 1000 via the wire harness 23. The ignition energy is controlled such that it is kept unchanged with a variation in the engine revolution speed (the cycle or the frequency of the crank angle signal 120) and a variation in the voltage of the battery 15, and the ignition timing is determined on the engine revolution speed and crankshaft torque taking the output torque, fuel economy and exhaust gases into account. The EGR control signal 223 is a signal relating to the opening degree of an exhaust gas recirculation valve (exhaust gas recirculation rate), which signal is delivered from the control unit 1000 via the wire harness 23. The EGR valve opening as mentioned above is determined on the engine revolution speed and the crankshaft torque taking the exhaust gas and fuel economy into account. A supercharge pressure control signal 224, which is generated via the wire harness 23, is used to control a supercharge pressure controller of a turbocharger so as to control a difference in pressure across a swing valve. With this signal, the swing valve controls fluid flow rate of exhaust gases passing through the turbocharger, thus regulating the supercharge pressure of an intake air admitted to the engine.

A reduction ratio control signal 240 is a signal corresponding to a reduction ratio (gear position) established in the transmission 4 and delivered from the control unit 1000 via the wire harness 24. The reduction ratio is determined on the input torque to the transmission (the engine crankshaft torque), i.e., the signal 121 or the signal (accelerator signal 103, intake air flow signal 122) corresponding to this signal 121, and the vehicle speed (output shaft revolution speed signal 140) taking the driving torque, fuel economy virbrations into account. The reduction ratio control signal 240 controls various kinds of shift solenoids of the transmission 4 in order to establish the desired gear position. The lock-up control signal 241 is a signal which controls connection and disconnection between the input and output elements of the torque converter in the transmission 4 and delivered from the control unit 1000 via the wire harness 24. The lock-up control signal 241 is determined on the crankshaft torque (signal 121) and the vehicle speed (signal 140) taking the fuel economy and vibrations into account, in order to control the above mentioned connection or if desired a relative rotation (slip) between the input and output elements of the torque converter.

Figure 3:
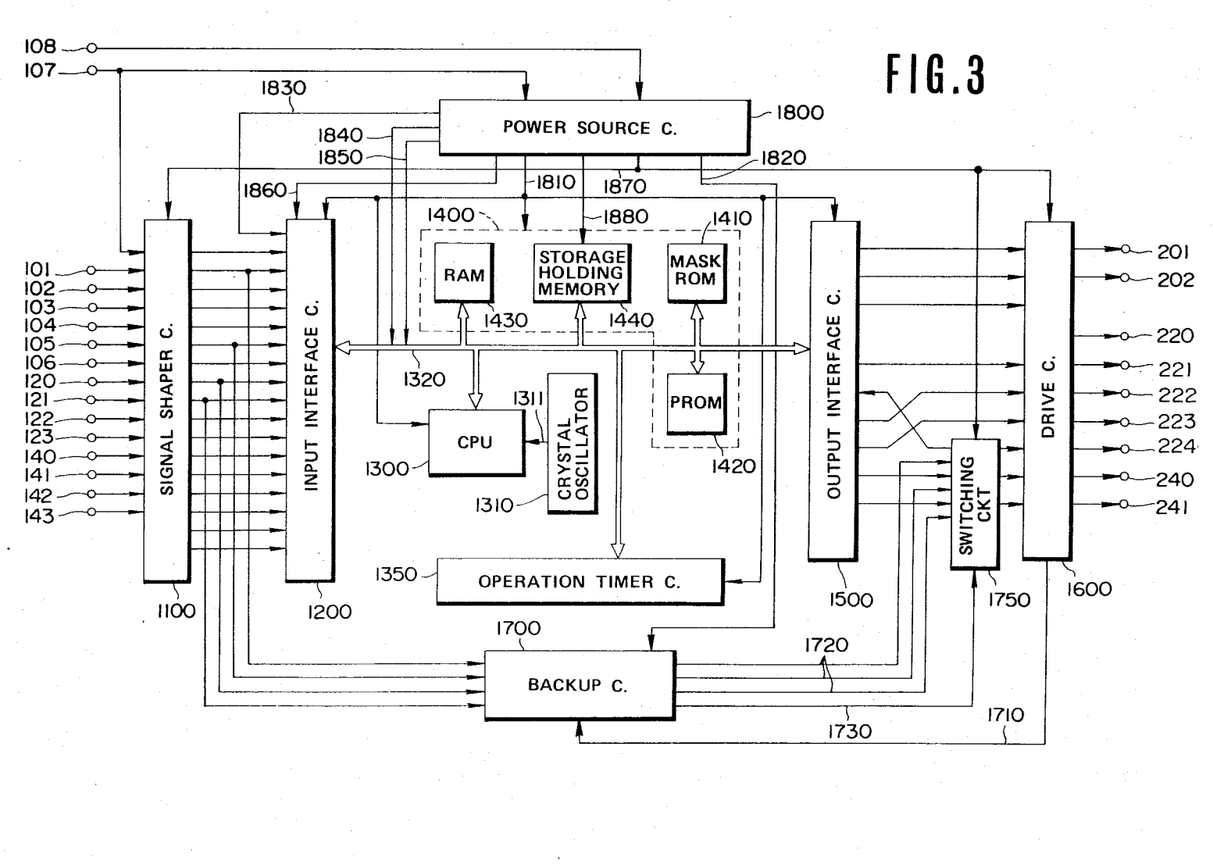
FIG. 3 is a detailed block diagram of the control unit.

Hereinafter, referring to FIG. 3, a practical example of the architecture of the control unit 1000 is described.

In this Figure, 1100 designates a signal shaper circuit which forms an input portion of the before mentioned various input signals 101 to 107, 120 to 123, 140, 141. It functions to eliminate noise of these input signals and absorbs surge thereof so as to prevent mulfunction of the control unit 1000 caused by the noise and destruction thereof caused by the surge, and it also performs amplification of the various input signals and conversion thereof so as to shape these signals, thereby to allow an input interface circuit 1200 to perform an accurate operation. The input interface circuit 1200 effects analog to digital (A/D) conversion of the various input signals which have been shaped by the circuit 1100, counts pulses for a predetermined time, converts these signals into digital coded signals which can be read as input data by a central processing unit (CPU) 1300 and stores them into the corresponding internal registers. The CPU 1300 operates in synchronism with a clock signal generated based on an oscillating signal generated by a crystal oscillator 1310. The CPU 1300 is connected via a bus 1320 to the input interface circuit 1200, a memory 1400, an output interface circuit 1500 and an operation timer circuit 1350. When, in operation, it executes a control program stored in a mask ROM 1410 and a PROM 1420 of the memory 1400, the CPU 1300 reads various input data from the corresponding registers within the input interface circuit 1300, performs arithmetic operations on these input data to generate various output data, delivers these output data to the corresponding registers within the output interface circuit 1500 with a predetermined timing. The memory 1400 is a storage device including in addition to the above mentioned mask ROM 1410 and the PROM 1420, a RAM 1430 and a storage holding memory 1440. The mask ROM 1410 is used to permanently store control programs and data used in executing the programs. The PROM 1420 is used to permanently store vehicle speed values, control programs which are subject to alteration depending upon the engine 3 and the transmission in terms of their kinds, which data are written into the PROM 1420 when the latter is installed in the control system. The RAM 1430 is a random access memory which is able to read and write data and used to temporarily store intermediate data resulting from arithmetic operations performed by the CPU 1300, and temporarily store the final data resulting from the arithmetic operations executed by the CPU 1300 before they are delivered to the output interface circuit 1500. The storage contents immediately disappear when the main power source 107 is disconnected when the ignition switch 10 is turned OFF. The storage holding memory 1440 is used to store such data as those intermediate data and final data of the arithmetic operations executed by the CPU 1300 which are to be held even after the automotive vehicle stops its operation, and it can hold the above mentioned data owing to the continuously connected power source 108 even after the main power source 107 is disconnected when the ignition switch 10 is turned OFF.

The operation timer circuit 1350 is provided to reinforce the facilities of the CPU 1300. It comprises a multiplication circuit for speeding processing in the CPU 1300, an interval timer for causing an interrupt signal upon elapse of a predetermined time and a free-running counter used for measuring a time elapsed in the CPU 1300 for effecting a shift from a predetermined event to a next event and measuring the instant when the event takes place. The output interface circuit 1500 stores the output data from the CPU 1300 into the corresponding internal registers. It converts these data into pulse signals or into switching signals which go into "1" or "0" before delivering them to a drive circuit 1600. The drive circuit 1600 is a power amplifier circuit which performs voltage or current amplification of the signals from the output interface circuit 1500 so as to produce the before mentioned various output signals 201, 202, 220 to 223, 240, 241.

Designated by 1700 is a backup circuit which is activated by a monitor signal 1710 caused by monitoring the signals produced by the drive circuit 1600. When it is activated indicating that the CPU 1300 or the memory 1400 has failed to normally operate due to trouble, the backup circuit 1700 receives a portion of the signals from the signal shaper circuit 1100 and generates output signals which enables the engine 3 and the transmission 4 to continue to operate such that the automotive vehicle can continue its running and also a switching signal 1730 informing the occurrence of a trouble. The signals 1720 and 1730 are supplied to a switching circuit 1750, causing the switching circuit 1750 to cut off signals from the output interface circuit 1500 and supply in lieu thereof the signals 1720 from the backup circuit 1700 to the drive circuit 1600, thereby to enable the automotive vehicle to safely run to an auto repair shop.

Designated by 1800 is a power source circuit which is supplied with the main power source 107 and the continuously connected power source 108. The power source circuit 1800 supplies a constant voltage 1810 of 5 V from the main power source 107 to the input interface circuit 1200, CPU 1300, memory 1400, output interface circuit 1500 and operation timer circuit 1350. It also supplies another constant voltage 1820 of 5 V to the backup circuit 1700, a signal 1830 indicative of "ON" or "OFF" state of the ignition switch 10 to the input interface circuit 1200, a reset signal 1840 and a stop signal 1850 for stopping the operation of the CPU 1300 to the bus 1320, a constant voltage 1860 for the internal A/D converter to the input interface circuit 1200, and a main voltage 1870 to the signal shaper circuit 1100, drive circuit 1600 and switching circuit 1750. Besides, the power source circuit 1800 supplies a constant voltage 1800 of 5 V from the continuously connected power source 108 to the storage holding memory 1440 for enabling same to operate even after the ignition switch 10 has been turned OFF.

Figure 4:
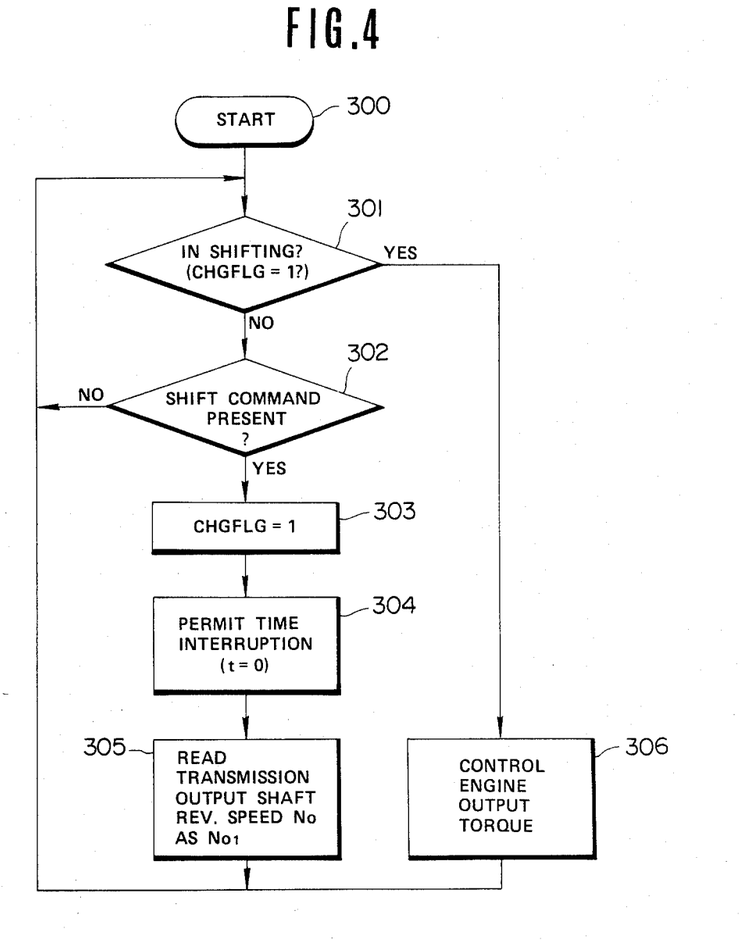
FIG. 4 is a flowchart of a control program stored in a ROM of the control unit.
Figure 5:
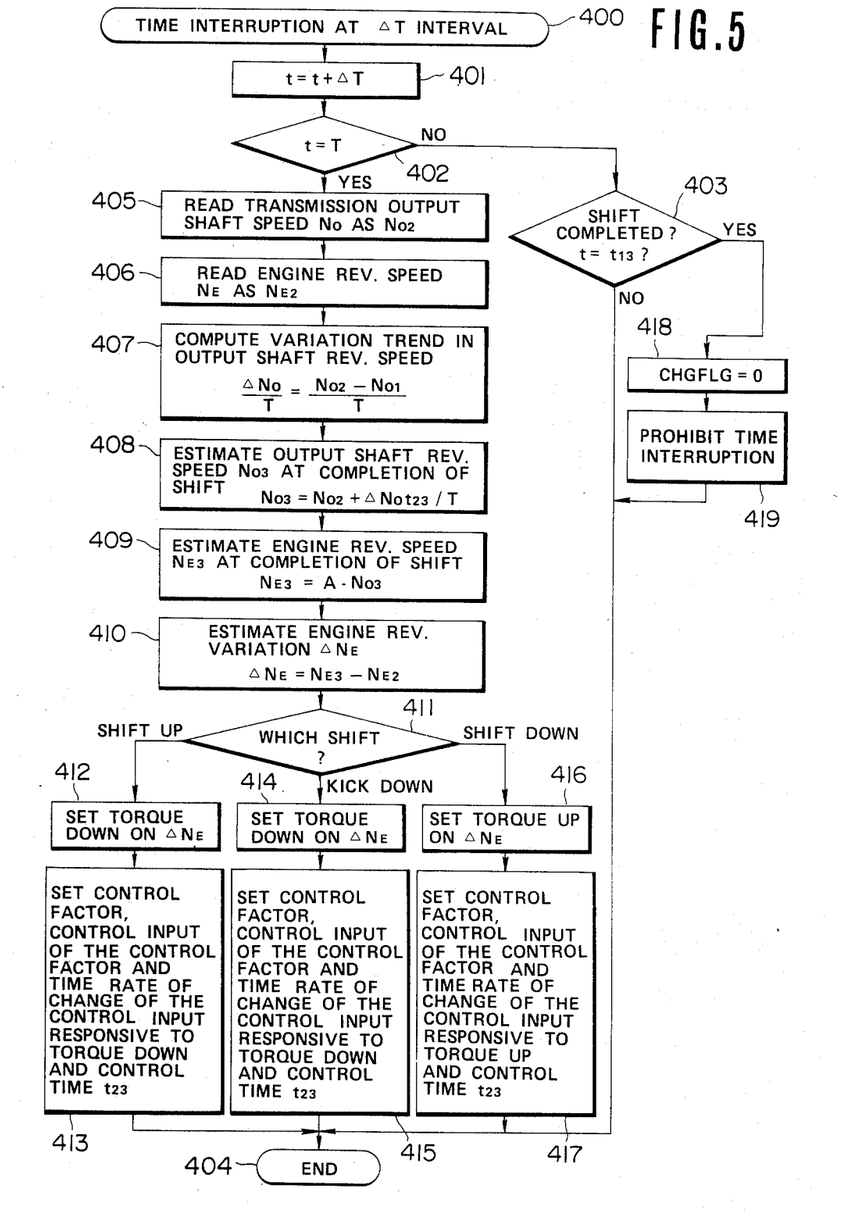
FIG. 5 is a flowchart of an interrupt control program stored in the ROM of the control unit.

Although the control unit 1000 constructed thus far controls the power train totally, i.e., the engine 3 and the automatic transmission 4, according to the present invention the control unit 1000 executes control programs as illustrated in FIGS. 4 and 5 in order to alleviate shift shocks.

Referring to FIG. 4, a background routine is shown wherein the execution of this routine is caused by entry of the ignition switch signal 101 in a step 300 and repeated thereafter until this signal 101 disappears. First of all a step 301 is executed wherein a decision is made whether or not a shift flag CHGFLG, which is later described and indicates that a shifting proceeds, is set at "1", i.e., whether or not the shifting proceeds. When the decision determines that the shifting is not yet carried out, a step 302 is executed where a decision is made whether or not a shift command is generated based on a decision whether or not the 1-2 shift signal 142 or the 2-3 shift signal 143 has undergone a level change. When the decision determines that there is no shift command, the control goes back to the step 301, repeating the execution of the steps 301 and 302 as long as there occurs no shift command.

Figure 6B:
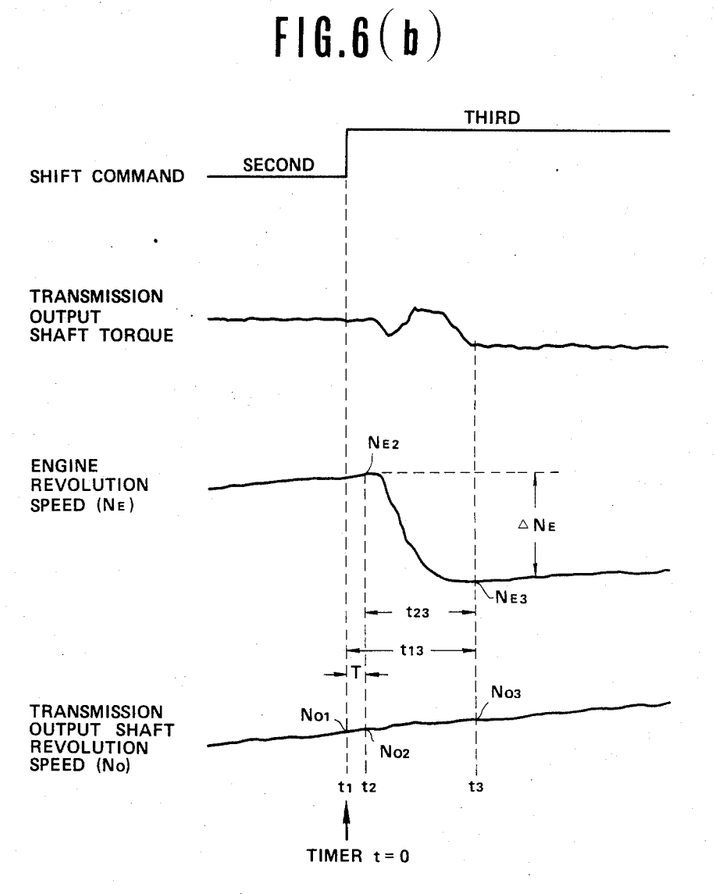
FIG. 6(b) is a similar time chart to FIG. 6 (b) illustrating 2-3 shift operation carried out according to the present invention.

When a shift command is produced in the transmission, the decision in the step 302 determines that the shift command is present and the control goes to a step 303 because the 1-2 shift signal 142 or the 2-3 shift signal 143 undergoes a level change. In this step 303, the shift flag CHGFLG is set at "1" and in the next step 304 a time interruption is permitted to allow execution of the time interrupt routine shown in FIG. 5 and a timer t, which is used in the timer interrupt routine, is reset to "0". Subsequently, the control goes to a step 305 where the output revolution speed $N_O$ of the automatic transmission 4 is read from the input signal 140. This transmission output shaft revolution speed $N_O$ corresponds to a transmission output shaft revolution speed $N_{O1}$ taking place at an instant $t_1$ when the 2-3 shift command appears taking as an example the 2-3 shift as illustrated in FIG. 6(b).

After the above process, although the control goes back to the step 301, the control goes to a step 306 from the step 301 because the shift flag CHGFLG has been set at "1" in the step 303. In the step 306, in order to control engine output torque, the correction of the output signals 220 to 224 are effected based on control factors (an intake air flow rate, a fuel injection flow rate, an ignition timing, an exhaust gas recirculation rate, a turbocharger supercharge pressure), their control input and their time rate of change of the control input, all of which are set in a manner which will be later described in connection with FIG. 5. After this step 306, although the control goes back to the step 301, the execution of the engine output torque control which is to be later described in connection with FIG. 5 is repeated as long as the shift flag CHGFLG stays in "1" until the shift flag CHGFLG is reset to "0" at the completion of shifting operation.

The interrupt routine shown in FIG. 5, whose execution is initiated provided the permission is made in the step 304, is executed by an interrupt signal which appears after lapse of a predetermined time duration $\Delta T$ (in a step 400). First of all, a step 401 is executed where the execution interval $\Delta T$ is added to the timer t to give a result as a new value for t, i.e., $t = t + \Delta T$. In the subsequent step 402, a decision is made whether or not the timer t has lapsed a scheduled time T after an instant when it was reset in the step 402 by the shift command, i.e., a decision whether or not the actual shifting operation beginning with engagement of a frictional element is about to begin. The length of the scheduled time T corresponds to a time duration from an instant $t_1$ when a shift command appears to an instant $t_2$ when the actual shifting operation resulting from the shift command is considered to take place in the case of 2-3 shift as illustrated in FIG. 6(b), and scheduled time T are empirically determined taking into account shift in its kind and oil conduit resistance.

When the decision determines that t is not equal to T, i.e., t is less than T or t is greater than T, a step 403 is selected where a decision is made whether or not shifting operation is completed. This decision is made based on a decision whether or not the timer t, which is reset to "0" whenever the shift command appears, indicates a scheduled time that begins with the instant when the shift command appears. In the case of 2-3 shift, this scheduled time corresponds to a time duration $t_{13}$ beginning with the instant $t_1$ when the shift command appears and ending with the instant $t_3$ when the shifting operation is considered to be completed as illustrated in FIG. 6(b) and it is empirically determined taking into account the shift in its kind and oil conduit resistance. When the decision in the step 403 determines that t is less than T, meaning that the shifting operation has not been completed yet, the control goes to a step 404 where the first time run of the interrupt routine ends. The execution of the above mentioned steps are repreated until it becomes equal to T.

When t becomes equal to T, i.e., when it reaches the instant $t_2$ in FIG. 6(b), the step 402 selects a step 405 where the transmission output revolution speed $N_O$ is read from the input signal 140. The transmission output revolution speed at this instant $t_2$ takes a value $N_{O2}$ in the case of 2-3 shift shown in FIG. 6(b). In the subsequent step 406, the engine revolution speed $N_E$ is read from the input signal 120. The engine revolution speed at this instant is $N_{E2}$ in the case of 2-3 shift shown in FIG. 6(b). Subsequently, the control goes to a step 407 where a variation trend of transmission output revolution speed $N_O$, i.e., $\Delta N_O/T$ (where $\Delta N_O$ is a variation in transmission output revolution speed $\Delta N_{O2} - N_{O1}$ between the two instants $t_1$ and $t_2$ in FIG. 6(b), is computed. The computed result is estimated as variation trend of transmission output revolution speed $N_O$. In the next step 408, an estimation of a transmission output revolution speed ($N_{03}$ in the case of FIG. 6(b)) at the instant of completion of shift (the instant $t_3$ in the case of FIG. 6(b)) is made based on the above mentioned variation trend. This estimation is made by computing an equation $N_{03} = N_{02} + \Delta N_0/T \times t_{23}$ in the case of FIG. 6(b), where: $t_{23}$ is a time duration from the instant $t_2$ to the instant $t_3$, which can be expressed by $t_{13} - T$. In the next step 409, an estimation of an engine revolution speed ($N_{E3}$ in the case of FIG. 6(b)) at the completion instant ($t_3$ in FIG. 6(b)) of shifting operation is made. This estimation is made by multiplying a gear ratio after the completion of shift (a gear ratio A for the third reduction ratio in the case of FIG. 6(b)) with the transmission output revolution speed at completion of the shift. In the case of FIG. 6(b), an equation $N_{E3} = A \cdot N_{03}$ is calculated to estimate the engine revolution speed $N_{E3}$ at completion of shift. In the next step 410, an engine revolution speed variation $\Delta N_E$ is estimated from a difference between the engine revolution speed at the initiation of the shift and the estimated engine revolution speed at the completion of the shift. In the case of FIG. 6(b), this estimation is made by an equation $\Delta N_E = N_{E3} - N_{E2}$.

Then, the control goes to a step 411 where a decision is made which shift is about to take place based on throttle opening degree read from the input signal 103 and on the information which of the input signal 142 and 143 have changed its level and in what direction. At 1-2 or 2-3 shift, the control goes to steps 412 and 413, at a shift with the fully opened throttle opening degree during kickdown, the control goes to steps 414 and 415, and at 2-1 and 3-2 shift, the control goes to steps 416 and 417.

In each of the steps 412 and 414, a drop in engine output torque (i.e., torque down) is set corresponding to the above mentioned estimated variation in engine revolution speed. In each of the steps 413 and 415, from the drop in torque and a time required for the control ($t_{23}$ in the case of FIG. 6(b)), control factors (intake air flow rate, fuel injection rate, ignition timing, and turbocharger supercharge pressure) necessary for the torque reduction are selected, control input of the selected control factors in such a direction as to cause engine output torque reduction to go down are set, and the rates of change in the control inputs within the control time are set. Describing further, in order to reduce engine output torque, in the case of the intake air flow rate or the fuel injection rate, it is decreased, in the case of the ignition timing, it is retarded, in the case of the exhaust gas recirculation, it is increased in quantity, and in the case of the turbocharger supercharge pressure, it is decreased. The time rate of change in each of the control inputs of the control factors are set such that the control input is large at the initial stage of control and gradually decreases as the control progresses, thereby to improve responsibility and control accuracy.

In the step 416, an increase in engine output torque corresponding to the estimated variation $\Delta N_E$ in engine revolution speed is determined. In the next step 417, from the torque increase thus determined and a time required for control (a time duration beginning with initiation of actual shift down and ending with the estimated completion of the shift), control factors (intake air flow rate, fuel injection rate, ignition timing, exhaust gas recirculation rate, turbocharger supercharge pressure) are selected necessary for the torque increase, the control input of the selected control factors in such a direction as to cause engine output torque increase are set, and besides, the rate of change in control input of the control factors during the control time are set. Needless to say, various control factors thus selected are controlled in a direction opposite to a direction causing the engine output torque to decrease.

From the fact that the flag CHGFLG = 1 holds in FIG. 4 and the step 306 is always selected by the step 301 when shifting progresses, it will be understood that among all signals which include air flow control signal 220, fuel injection control signal 221, ignition timing control signal 222, EGR control signal 223 and supercharging pressure control signal 224, those signals which correspond to the selected control factors are corrected by the set control input at the set rate of change, thereby to increase or decrease engine output torque. It follows that the engine output torque can be controlled during shifting operation such that shift shocks which are caused by creation of considerable difference between engine revolution speed and transmission output revolution speed are satisfactorily alleviated. Describing further regarding 2-3 shift up in connection with FIGS. 6(a) and 6(b), since the difference between the engine revolution speed $N_E$ and the transmission output revolution speed $N_O$ does not considerably increase in the case of FIG. 6(b) and thus do not cause a peak in output torque to appear as compared to the case illustrated in FIG. 6(a) where a peak $T_{r1}$ in output torque appears.

From the step 413 or 415 or 417, the control goes to the step 404 in FIG. 5, causing the control to go back to the step 400 where the interrupt routine is executed again, but since the timer t is greater than T, the step 402 selects the step 403. Initially, the timer t does not indicate shift completion time ($t_{13}$ in the case of FIG. 6(b)), the control goes to the step 404. As it progresses, it reaches the shift completion instant ($t_3$ in the case of FIG. 6(b)), the step 403 selects steps 418 and 419 before selecting the step 404 at which the interrupt routine ends because the timer t indicates the shift completion instant ($t = t_{13}$ in the case of FIG. 6(b). In the step 418, the shift flag CHGFLG is reset to "0" and in the next step 419, the time interruption is prohibited so as to prevent initiation of time interrupt routine illustrated in FIG. 5.

What is claimed is:

1. A method of alleviating shocks occurring when a transmission shifts from one reduction ratio to another reduction ratio, the transmission having an output shaft and being driven by an engine, said method comprising the steps of:

detecting a shift command occurring in the transmission from the one reduction ratio to the other reduction ratio and generating a shift command signal;

estimating responsive to said shift command signal and engine revolution speed variation during actual shifting operation in the transmission which is caused by the occurrence of said shift command and generating an estimated engine revolution speed variation signal indicative of the engine revolution speed variation estimated; and controlling the engine such that the output torque of the engine is subjected to a temporary change that is variable in response to said estimated engine revolution speed variation signal so as to alleviate shocks occurring during the shifting operation.

2. A method as claimed in claim 1, wherein said engine controlling step includes:

setting a target torque variation in output torque of the engine in response to said estimated engine revolution speed variation signal and generating a target torque variation signal; and controlling at least one control factor for the engine such as to cause a change in output torque of the engine corresponding to an amount indicated by said target torque variation signal.

3. A method as claimed in claim 1, wherein said engine revolution speed variation estimating step includes:

detecting an engine revolution speed of the engine at a first instant when the actual shifting operation is scheduled to begin and generating a detected engine revolution speed signal indicative of said detected engine revolution speed signal;

estimating responsive to said detected engine revolution speed signal an engine revolution speed of the engine at a second instant when the shifting operation is scheduled to be completed and generating an estimated engine revolution speed signal indicative of said estimated engine revolution speed; and subtracting said detected engine revolution speed signal from said estimated engine revolution speed signal to give a result and generating said result in terms of said estimated engine revolution speed variation indicative signal.

4. A method as claimed in claim 3, wherein said engine revolution speed estimating step includes:

determining a variation trend in a transmission output shaft revolution speed of the output shaft of the transmission from a variation in the transmission output shaft revolution speed occurring between an instant when said shift command signal is generated and said first instant when the actual shifting operation is scheduled to begin and generating an output shaft revolution speed variation trend signal;

estimating a transmission output shaft revolution speed of the output shaft of the transmission at said second instant when the shifting operation is scheduled to be completed by a computation on said output shaft revolution speed variation trend signal, a transmission output shaft revolution speed at said first instant when the actual shifting operation is scheduled to begin and a predetermined time duration beginning with said first instant and ending with said second instant and generating an estimated transmission output shaft revolution speed signal; and computing on said estimated transmission output shaft revolution speed signal and the another reduction ratio to give a result and generating said result in terms of said estimated engine revolution speed signal.

5. A method as claimed in claim 3, wherein output torque of the engine is varied by controlling at least one of ignition timing, fuel supply, exhaust gas recirculation rate, intake air flow rate and supercharging pressure.

6. An apparatus for alleviating shocks occurring when a transmission shifts from one reduction ratio to another reduction ratio, the transmission having an output shaft and being driven by an engine, said apparatus comprising:

means for detecting a shift command occurring in the transmission from the one reduction ratio to the other reduction ratio and generating a shift command signal;

means for estimating responsive to said shift command signal an engine revolution speed variation during actual shifting operation in the transmission which is caused by the occurrence of said shift command and generating an estimated engine revolution speed variation signal indicative of the engine revolution speed variation estimated; and means for controlling the engine such that the output torque of the engine is subjected to a temporary change that is variable in response to said estimated engine revolution speed variation signal so as to alleviate shocks occurring during the shifting operation.

7. An apparatus as claimed in claim 6, wherein said engine controlling means includes:

means for setting a target torque variation in output torque of the engine in response to said estimated engine revolution speed variation signal and generating a target torque variation signal; and means for controlling at least one control factor for the engine such as to cause a change in output torque of the engine corresponding to an amount indicated by said target torque variation signal.

8. An apparatus as claimed in claim 6, wherein said engine revolution speed variation estimating means includes:

means for detecting an engine revolution speed of the engine at a first instant when the actual shifting operation is scheduled to begin and generating a detected engine revolution speed signal indicative of said detected engine revolution speed signal;

means for estimating responsive to said detected engine revolution speed signal an engine revolution speed of the engine at a second instant when the shifting operation is scheduled to be completed and generating an estimated engine revolution speed signal indicative of said estimated engine revolution speed; and means for subtracting said detected engine revolution speed signal from said estimated engine revolution speed signal to give a result and generating said result in terms of said estimated engine revolution speed variation indicative signal.

9. An apparatus as claimed in claim 8, wherein said engine revolution speed estimating means includes:

means for determining a variation trend in a transmission output shaft revolution speed of the output shaft of the transmission from a variation in the transmission output shaft revolution speed occurring between an instant when said shift command signal is generated and said first instant when the actual shifting operation is scheduled to begin and generating an output shaft revolution speed variation trend signal;

means for estimating a transmission output shaft revolution speed of the output shaft of the transmission at said second instant when the shifting operation is scheduled to be completed by a computation on said output shaft revolution speed variation trend signal, a transmission output shaft revolution speed at said first instant when the actual shifting operation is scheduled to begin and a predetermined time duration beginning with said first instant and ending with said second instant and generating an estimated transmission output shaft revolution speed signal; and means for computing on said estimated transmission output shaft revolution speed signal and the another reduction ratio to give a result and generating said result in terms of said estimated engine revolution speed signal.

10. An apparatus as claimed in claim 8, wherein output torque of the engine is varied by controlling at least one of ignition timing, fuel supply, exhaust gas recirculation rate, intake air flow rate and supercharging pressure.

* * * * *